July 30, 1957 N. D. CAPPELLE ET AL 2,800,808
INDEX MECHANISM
Filed March 18, 1953
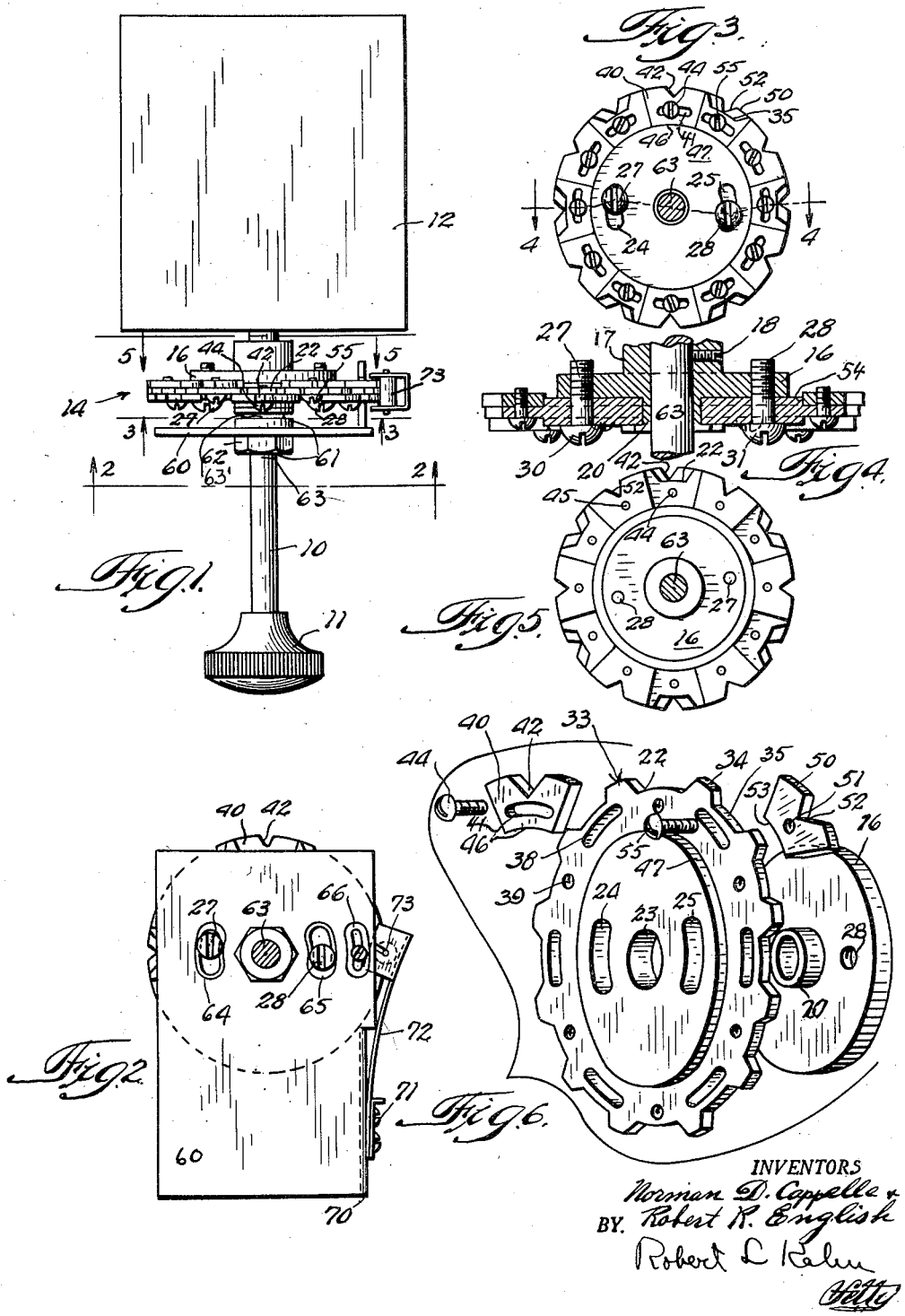
INVENTORS
Norman D. Cappelle &
BY Robert R. English
Robert L. Kahn

2,800,808

INDEX MECHANISM

Norman D. Cappelle, Chicago, and Robert R. English, Itasca, Ill., assignors to Oak Mfg. Co., a corporation of Illinois Application March 18, 1953, Serial No. 343,174

5 Claims. (Cl. 74—527)

This invention relates to an index mechanism having means for adjusting the index positions and being generally useful on such apparatus as communications receivers and television receivers of the type having continuous tuning means. There are many tuning means having a continuous frequency variation from one end of the range to the other end of the range. It is frequently desirable to provide means for indexing such tuning means to any one of a desired number of predetermined index positions. It is also desirable to provide means for adjusting the index point so that the tuning means may be brought into desired position accurately.

For a more complete understanding of the invention, reference will now be made to the drawing, wherein an exemplary embodiment is shown, it being understood that substantial variations may be made without departing from the spirit of the invention, except as defined by the appended claims.

Referring to the drawing:

Figure 1 is a top view of an index mechanism embodying the present invention, said mechanism being associated with a desired tuning means;

Figure 2 is a sectional view along line 2—2 of Figure 1;

Figure 3 is a sectional view along line 3—3 of Figure 1;

Figure 4 is a sectional view along broken line 4—4 of Figure 3;

Figure 5 is a sectional detail along line 5—5 of Figure 1;

Figure 6 is an exploded view of the index plate and various parts making up the index positions.

The index mechanism embodying the present invention is adapted for use with shaft 10 having knob 11 and controlling a suitable means to be indexed, such as tuner 12. Tuner 12 is of the type continuously variable over its tunable range and may consist of a variable condenser, variable inductor, or a combination of the two. Inasmuch as the tuner forms no part of the present invention, no details of the tuner are given.

The index mechanism itself is generally indicated by numeral 14 and has mounting disc 16, provided with hub 17, adapted to be rigidly locked to shaft 10 as by means of set screw 18. The mounting disc has hub portion 17 which extends rearwardly along the shaft, this being away from knob 11 in a direction toward tuner 12. Mounting disc 16 also has hub support portion 20 extending forwardly of disc portion 16.

Disposed over support portion 20 is index plate 22. Index plate 22 has aperture 23 large enough to permit support portion 20 to pass through the same. Index plate 22 also has a number of elongated slots 24 and 25. While two slots are shown, it is clear that the number may be increased or decreased, as desired. The two slots are diametrically opposed, the slots being arcuate. Slots 24 and 25 are adapted to register with a pair of tapped apertures 27 and 28 in support plate 16. Screws 30 and 31 having enlarged heads as shown, pass through slots 24 and 25 to engage the threading in apertures 27 and 28. Thus index plate 22 may be rigidly secured to support plate 16, the elongated slots 24 and 25 permitting a predetermined amount of angular adjustment of plate 22 with respect to support plate 16.

Index plate 22 has peripheral index portion generally indicated by numeral 33. This index portion is flat in planes normal to the shaft axis and the index portion itself has a plurality of teeth 34 extending outwardly therefrom, adjacent teeth being separated by cut-away parts 35. While the number and arrangement of the teeth and cut-away parts is not important, and may be varied to suit requirements, the construction shows a regular arrangement of teeth and cut-away parts with each tooth generally subtending an angle somewhat less than the angle subtended by a cut-away part.

Peripheral index poriton 33 of plate 22 has alternate elongated slots 38 and tapped apertures 39. The arrangement of slots and apertures may be varied to suit requirements and, as shown here, the slots and apertures are disposed to lie in from cut-away parts 35. The angular extent of slots 38 may be as great as necessary and in practice may extend for about the same angular distance as that of cut-away parts 35.

Disposed on one side of peripheral index portion 33 are a number of index blocks 40, having elongated arcuate slots 41 and V notches 42. Bolts 44 are adapted to pass through slot 41 of an index block and will engage a tapped recess 39. As shown in Figure 3, index blocks 40 may be adjusted angularly and retained tightly in position by bolt 44. Each block 40 has the inner edge portion 46 curved to conform to annular flange 47 formed on index plate 22. This flange portion is along the inner part of peripheral portion 33 and is thick enough so that index blocks 40, when disposed against peripheral index portion 33, will be generally flush with the body of index plate 22.

Disposed on the reverse, in this instance the rear, face of index plate 22 are series of index blocks 50 having generally the same construction as blocks 40 except that index blocks 50 are provided with tapped recess 51. The remaining construction is identical, including the V notch 52 and inner edge portion 53. Index plate 22 has flange 54 on the rear face thereof, corresponding to flange 47, on the front portion. Thus both the front and rear series of index blocks will be radially maintained in fixed position while being angularly adjustable. Index blocks 50 are retained in position by bolts 55 extending from the front of the index plate through elongated slots 38 of the index plate and engaging aperture 51.

The dimensions of the index blocks are such that when the index blocks are disposed in position as shown in Figure 3, the index V indentations 42 and 52 in both the front and rear series of blocks will be available for index action, cutouts 35 providing sufficient clearance both radially and angularly to permit proper index action.

Shaft 10 passes through panel 60 and has bushing 61 and lock nut 62 disposed on opposite sides of the panel. C washer 63 cooperates with an annular slot in the shaft to lock the shaft against longitudinal movement in the direction toward tuner 12. Suitable means such as an additional C washer 63' may be provided upon the inner side of bushing 61 to lock shaft 10 against outward movement longitudinally of the shaft.

Panel 60 has a pair of elongated slots 64 and 65 which are adapted to register with the heads of bolts 30 and 31 when the index plate is turned in a proper position. Thus a screw-driver may be inserted through slots 64 and 65 of the panel for the purpose of adjusting the rotary position of the index plate with reference to support plate 16. Panel 60 also has elongated slot 66 which will register with successive bolts 44 or 55, depending upon the angular position of the index plate. Thus any one of these bolts may be loosened or tightened successively from the front of the panel, as the index mechanism is advanced.

Panel 60 has flange portion 70 upon which is rigidly attached as at 71, leaf spring 72 carrying index roller 73. The index roller has a sufficiently large width axially of the shaft so that the index roller may engage the V notches of the index blocks on either side of the index plate.

It is clear that each index block may be angularly adjusted to provide any angular pattern of index action.

What is claimed is:

1. An adjustable index mechanism comprising a shaft, means for mounting a shaft in a panel for rotation, an index plate carried by said shaft, said index plate having a peripheral portion, said peripheral portion consisting of alternate elongated slots and tapped apertures, notched index blocks, there being one series of blocks on one side of the index plate, said one series of blocks having elongated slots, there being another series of blocks on the other side of the index plate, said other series of blocks having tapped recesses, bolts for adjustably securing said blocks on said index plate, the one series of blocks being secured to the tapped apertures on the index plate while the other series of blocks are secured by bolts passing through the elongated slots in the index plate and means adapted to be carried by the panel for engaging the notches in the index blocks for indexing purposes.

2. The construction according to claim 1, wherein the index plate has annular flanges on the two sides thereof and wherein said index blocks have the inner edge curved to fit against the flanges whereby the index blocks are supported against radial movement but are adjustable angularly.

3. The construction according to claim 1, wherein said index plate is carried by a supporting disc and wherein means are provided for adjustably securing said index plate to said supporting disc.

4. The construction according to claim 1, wherein said panel has an opening registering with each bolt in a predetermined plate position.

5. The construction according to claim 1, wherein the means adapted to be carried by the panel includes a leaf spring and roller wide enough to engage all index blocks.

References Cited in the file of this patent

UNITED STATES PATENTS

| 2,115,624 | Eisenmann | Apr. 26, 1938 |
| 2,316,547 | Baum et al. | Apr. 13, 1943 |
| 2,612,051 | Felt | Sept. 30, 1952 |
| 2,620,672 | McMahon | Dec. 9, 1952 |

FOREIGN PATENTS

| 94,650 | Sweden | Feb. 15, 1939 |